United States Patent [19]
Chamberlin

[11] Patent Number: 5,628,496
[45] Date of Patent: May 13, 1997

[54] PNEUMATIC SPRING

[75] Inventor: James Chamberlin, Charlotte, N.C.

[73] Assignee: AVM, Inc., Marion, S.C.

[21] Appl. No.: 472,501

[22] Filed: Jun. 7, 1995

[51] Int. Cl.$^6$ .................................................. F16F 5/00
[52] U.S. Cl. ................... 267/64.11; 188/269; 267/124; 267/64.26; 267/129
[58] Field of Search .................... 267/120, 124–127, 267/64.11–64.28, 113, 114, 118, 119, 130, 129, DIG. 1, DIG. 2; 188/280–282, 284, 311–320, 322.15, 269, 322.22, 322.17, 322.19; 16/66–70, 84; 213/43

[56] References Cited

U.S. PATENT DOCUMENTS

| | | | |
|---|---|---|---|
| 1,289,132 | 12/1918 | Eaton | 267/64.11 |
| 2,101,265 | 12/1937 | Mercier | 267/64.11 |
| 2,959,410 | 11/1960 | Fullam et al. | 267/64.25 |
| 3,101,194 | 8/1963 | Hennells, Sr. | 267/119 |
| 3,147,967 | 9/1964 | Bougeard | 267/64.11 |
| 3,281,138 | 10/1966 | Oster | 267/124 |
| 3,963,227 | 6/1976 | Mölders | 267/120 |
| 4,005,763 | 2/1977 | Wallis | 267/119 |
| 4,030,715 | 6/1977 | Duran | 267/64.11 |
| 4,263,488 | 4/1981 | Freitag et al. | 267/120 |
| 4,342,448 | 8/1982 | Wallis | 267/64.28 |
| 4,548,389 | 10/1985 | Smith et al. | 267/124 |
| 4,664,141 | 5/1987 | Starr | 267/64.28 |
| 4,693,343 | 9/1987 | Boyd | 267/64.11 |
| 4,739,976 | 4/1988 | Myers | 267/64.26 |
| 4,815,718 | 3/1989 | Kadis | 267/130 |
| 5,014,966 | 5/1991 | Wang | 188/269 |
| 5,036,887 | 8/1991 | Joy et al. | |
| 5,076,404 | 12/1991 | Gustafsson | 267/130 |
| 5,197,718 | 3/1993 | Wallis | 267/124 |
| 5,314,172 | 5/1994 | Wallis | 267/130 |
| 5,465,811 | 11/1995 | Katz | 267/119 |

FOREIGN PATENT DOCUMENTS

| | | | |
|---|---|---|---|
| 670589 | 11/1929 | France | 267/64.14 |
| 2421007 | 11/1975 | Germany | 267/64.26 |
| 3813021 | 11/1989 | Germany | 267/64.26 |
| 0589479 | 1/1978 | U.S.S.R. | 267/64.11 |

*Primary Examiner*—Douglas C. Butler
*Attorney, Agent, or Firm*—McAndrews, Held & Malloy, Ltd.

[57] ABSTRACT

A pneumatic counterbalance spring includes a hollow cylinder defining a first internal chamber divided into a compression compartment and an extension compartment by a piston movably mounted in the chamber. The compression compartment contains pressurized gas and a seal assembly mounted on the piston prevents the gas from escaping into the extension compartmint. A piston rod is slibably mounted in the open end of the cylinder and has its inner end connected to the piston. The piston rod includes a hollow portion defining a second internal chamber which is fluidly connected to the compression compartment by a flow passage. As a result, the compression compartment has an effective volume of A+B, where A represents the volume of the compression compartment and B represents the volume of the piston rod internal chamber. This design is advantageous in applications where a low spring rate is desired and where the length of the spring needs to be minimized. A gas permeable insert may be positioned in the flow passage to provide restricted rate flow of gas through the flow passage. Alternatively, a check valve may be provided for providing restricted rate flow of gas through the flow passage during the extension stroke and a tree, by-pass flow of gas through the flow passage during the compression stroke.

21 Claims, 3 Drawing Sheets

5,628,496

PNEUMATIC SPRING

TECHNICAL FIELD

The present invention relates generally to a pneumatic spring and, more particularly, to a pneumatic spring which increases the surface area of the piston acted on by pressurized gas contained in the spring.

BACKGROUND

Pneumatic or gas springs are commonly used to provide a counterbalance force for closure units, such as lids, doors and cabinet fronts, and to provide gas spring replacement for mechanical spring. In the automotive field, for example, pneumatic springs are used to assist in opening and supporting trunk lids and hatchbacks. In such applications, the counterbalance spring assemblies are compressed when the lid is closed, and they extend under differential pressure force acting on the piston when the lid is opened.

In conventional pneumatic springs, both the extension and compression chambers are pressurized, and therefore, the pressure differential between the cylinder and the atmosphere only acts on the effective cross-section area of the piston rod which lies in a plane 90° to the longitudinal axis of the rod. As a result, and in a majority of applications, a relatively high internal cylinder pressure is required to cause the spring to extend. For example, in automotive applications it is not uncommon for the pneumatic springs to be pressurized to 2000 psi or more. These high operating pressures impose stringent strength requirements on the materials used to fabricate the pneumatic spring components and this adds to the complexity of the manufacturing process.

SUMMARY OF THE INVENTION

Accordingly an object of the present invention is to provide a pneumatic spring in which the pressurized gas within the spring acts over an increased cross-sectional area of the piston.

Another object of the present invention is to provide a pneumatic spring which provides for different flow rates through the piston during the compression and expansion strokes.

Still another object of the present invention is to provide a pneumatic spring having an integrally formed piston and piston rod assembly.

A further object of the present invention is to provide a pneumatic spring in which the extension chamber is not pressurized.

Still a further object of the present invention is to provide a pneumatic spring which produces output forces comparable to traditional pneumatic springs at much lower internal pressures.

Another object of the present invention is to provide a pneumatic spring which is suitable for applications requiring a low spring rate and a reduced overall length.

A further object of the present invention is to provide a pneumatic spring in which damping is fully independent of spring orientation.

Yet another object of the present invention is to provide a pneumatic spring which is relatively easy and economical to manufacture.

Another object of the present invention is to provide a pneumatic spring having a design which reduces gas loss from within the spring.

These and other objects and advantages are provided by a pneumatic spring comprising a hollow cylinder defining a first internal chamber having an open end and a closed end. A piston rod is slidably mounted in the open end of the cylinder. The piston rod includes a hollow portion defining a second internal chamber, a first end extending into the first internal chamber, and a second end projecting from the open end of the cylinder. A piston is slidably positioned in the cylinder and is connected to the first end of the piston rod for movement therewith. The piston divides the first internal chamber into a compression compartment adjacent the closed end of the cylinder and an extension compartment adjacent the open end of the cylinder. A predetermined quantity of gas is disposed in the compression compartment under a pressure in excess of atmospheric pressure. A seal assembly is mounted on the piston for preventing gas from bypassing the piston and flowing between the compression and extension compartments. A flow passage extends through the piston between the compression compartment and the second internal chamber to permit the gas to flow therebetween.

In accordance with one embodiment, a gas permeable insert of a predetermined porosity is positioned in the flow passage to provide a restricted flow rate through the flow passage. In accordance with another embodiment, a check valve enables a restricted flow rate through the flow passage during the extension stroke and a free, by-pass flow of gas through the flow passage during the compression stroke. The check valve includes a gas permeable insert mounted with the piston for movement between a first position at which gas flow through the flow passage is limited to that which flows through the gas permeable insert. The check valve moves to a second position during the compression stroke to permit gas flowing through the flow passage to by-pass the gas permeable insert. The gas permeable insert can be formed of a variety of materials including sintered bronze, sintered iron, porous ceramic, or porous plastics.

Other objects and advantages of the present invention will become apparent upon reference to the accompanying detailed description when taken in conjunction with the following drawings.

DETAILED DESCRIPTION OF THE PREFERRED EMBODIMENTS

Figure 1:
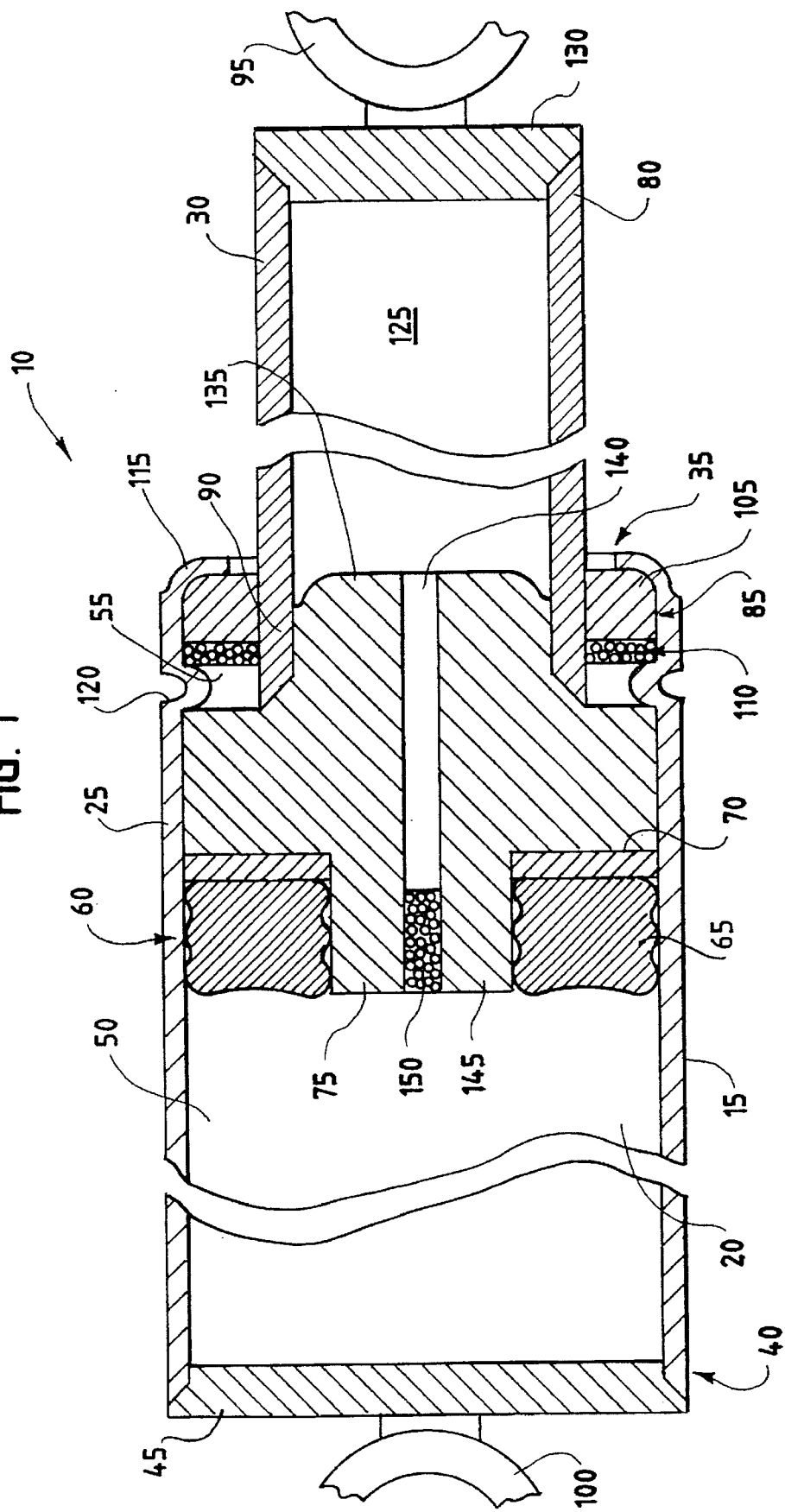
FIG. 1 is a cross-sectional view of a first embodiment of a pneumatic spring.

Referring to FIG. 1, a first embodiment of a pneumatic spring 10 includes a hollow cylindrical tube (cylinder) 15 defining an internal chamber 20, a piston 25, and a piston rod 30. As will be understood, the length of the cylinder 15 and sizing of the other components is determined by the intended application of the spring 10. A first end 35 of the cylinder 15 is open and a second end 40 of the cylinder 15 is closed by an end cap 45 which is secured to the cylinder 15 by a method such as welding or swaging. A piston 25 is slidably positioned within the cylinder 15 and divides internal chamber 20 into a compression compartment 50 adjacent the closed end 40 of the cylinder 15 and an extension compartment 55 adjacent the open end 35 of the cylinder 15. The volumes of the compartments 50, 55 vary according to the position of the piston 25 within the internal chamber 20. The compression compartment 50 is filled with a gas (preferably an inert gas such as nitrogen) under a pressure greater than atmospheric pressure, whereas the extension compartment 55 is unpressurized and normally approximates atmospheric pressure. A predetermined amount, e.g., 2.5 cc, of lubricating oil may be placed in compartment 50 to provide lubrication between the piston and the inner diameter of the cylinder 15.

Unlike prior designs, the compression and extension compartments 50, 55 are not in fluid (i.e. gas or liquid) communication with each other. Rather, a seal assembly 60 positioned between the piston 25 and the inner diameter of the cylinder 15 prevents the pressurized gas in the compression compartment 50 from escaping into the extension compartment 55. The seal assembly 60 includes a large bi-directional ring seal 65 (known as a Quad-seal) and a washer 70, both of which are mounted on a reduced diameter portion 75 of the piston 25. Although the seal assembly 60 is mounted on the piston's inner face, it could readily be positioned at other locations such as the piston's outer face or its outer diameter.

The Quad-seal 65 provides an excellent bi-directional seal between the piston 25 and the cylinder 15 while imposing relatively low friction forces against the cylinder walls during extension and compression strokes. The Quad-seal 65 provides a multiple circumferential line contact with both the piston 25 and the inner diameter of the cylinder 15, in effect acting like a plurality of small O-rings. In this respect, it should be noted that a plurality of O-rings could be substituted for the Quad-seal 65. The washer 70 is provided to act as a resilient backing for the Quad-seal 65 and to prevent seal damage in higher pressure applications.

The piston rod 30 is slidably mounted in the open end of the cylinder 15. The outer end 80 of the piston rod 30 projects out through a bushing assembly 85 mounted in the open end 35 of the cylinder 15 while the inner end 90 is fixedly connected to the piston 25. The outer end 80 of the piston rod terminates in a first connector link 95 which is rigidly secured to the piston rod 30 by a means such as screw threads or welding. A second connector link 100 is similarly secured to the end cap 45 of the cylinder 15. The connector links 95, 100 permit the pneumatic spring 10 to be connected, for example, between a vehicle body and a load, e.g. the hood, trunk, hatch, etc.

The bushing assembly 85 includes a shaped bushing 105 and washer 110, both of which have a free, close fit around the rod 30 and within the cylinder 15. The washer 110 is preferably made from a sintered plastic. Suitable materials for the washer 110 are commercially available under the tradenames Poron and Teflon. The bushing 105 and washer 110 are secured within the cylinder 15 between a crimp 115 formed in the open end 35 of the cylinder 15 and a rolled indentation 120 formed in the cylinder wall. The rolled indentation 120 also functions as a stop to limit piston travel during the extension stroke. In contrast with prior pneumatic spring designs, it is not necessary to seal the open end 35 of the cylinder 15 because the extension compartment 55 is not pressurized. In fact, a bore (not shown) may be provided for venting the extension compartment 55 to the atmosphere to reduce any pressure differential between the extension compartment 55 and the atmosphere during movement of the piston 25.

The piston rod 30 includes a hollow portion defining an internal chamber 125 of a fixed volume. Preferably, the piston rod 30 is formed of hollow tubing and, as such, the internal chamber 125 extends along substantially the entire length of the piston rod 30. The projecting end 80 of the piston rod 30 is closed by an end cap 130 which is secured to the piston rod 30 by a method such as welding or swaging. The internal end 90 of the piston rod 30 is connected to a reduced diameter portion 135 formed on the outer face of the piston 25 by a method such as welding (as shown), brazing or a shrink fit, etc. The reduced diameter portion 135 of the piston 25 extends into the piston rod internal chamber 125 and forms a seal between the piston rod 30 and the piston 25. A flow passage 140 extends through the piston 25 between the compression compartment 50 and the piston rod internal chamber 125. A gas permeable insert 150 is secured within flow passage 140 to restrict the flow of pressurized gas between the compression compartment 50 and the internal chamber 125.

Operation of the pneumatic spring 10 of FIG. 1 will now be described by way of example. For illustration purposes, it is assumed that the pneumatic spring 10 is connected to a hinged door (not shown) for moving the door between an open position and a closed position. For this purpose, one of the connector links 95, 100 is connected to a stationary member, such as the door frame, and the other connector link 95, 100 is connected to the door for moving the door relative to the frame.

When the door is closed, the pneumatic spring 10 is at its compressed position with the piston 25 moved towards the closed end 40 of the cylinder 15 and the pressures within the compression compartments 50 and the internal chamber 125 are equalized. Once the door is unlatched, the pressurized gas in the compression compartment 50 acts against the internal face 145 of the piston (as defined by the piston 25 and the Quad-ring 65), driving the piston 25 towards the open end 35 of the cylinder 15. The piston 25 in turn extends the piston rod 30, moving the door towards its open position. Because the pressurized gas acts on the entire surface area of the piston's internal face 145 and atmospheric pressure acts on the end cap 130 and piston face 136, output forces equal to those of traditional gas springs are produced at much lower internal pressures. The additional gas volume 125 serves to provide a lower spring rate. When and external force is subsequently applied to close the door, i.e., compress the spring assembly, the piston rod 30 is pushed into the cylinder 15, driving the piston 25 towards the closed end 40 of the cylinder 15. The increasing pressure in the compression compartment 50 forces gas through the flow passage 140 (and insert 150) and into the piston rod internal chamber 125. As will be appreciated, the size of the flow passage 140 may be increased or decreased to vary the rate of pressure equalization between the volumes 50, 125. The additional volume of the piston rod internal chamber 125 reduces the pressure rate of increase occurring in the compression compartment 50 during the compression stroke, thereby reducing the rate of increase of the force required to compress the spring 10. The total gas volume 125 can be adjusted to vary the 'rate' of the spring.

The above-described design provides an extension rate which is a function of the pressurized gas volume, the gas pressure, and the external load attached to the spring 10. Its tubular construction is advantageous from a cost standpoint. The increased volume provided by the piston rod internal chamber 125 makes this design ideal for applications where a low spring rate is desired and where the length of the spring 10 needs to be minimized. In addition, the reduced operating gas pressures of the spring extend its useful life by reducing the likelihood of charge loss by the spring.

By the application of the gas permeable insert, a more controlled extension rate is obtained. A variety of materials are suitable for forming the permeable insert 150, including sintered bronze, sintered iron, a combination of sintered bronze and iron, porous ceramic and certain plastics. Permeable insert 150 slows the rate of pressure equalization between the compression compartment 50 and the piston rod internal chamber 125, resulting in a "soft" or controlled force to the end of the extension stroke. In essence, the insert 150 causes the piston rod internal chamber 125 to act as a "booster" chamber which maintains or gradually increases the spring's output force near the end of the extension stroke.

When the spring has been compressed for a sufficient time, the gas pressure in the compression compartment 50 and the piston rod internal chamber 125 will be equalized by flow through the insert 150. Once the door is unlatched, the pressurized gas in the compression compartment 50 drives the piston 25 towards the open end 35 of the cylinder 15. As the piston 25 moves towards its extended position, the pressure in the compression compartment 50 drops below that of the piston rod internal chamber. This pressure differential causes pressurized gas from the piston rod internal chamber 125 to flow through the flow passage 140 and porous insert 150 and into the expanding volume of the compression compartment 50. The permeable insert 150, however, controls the rate of pressure equalization between the two volumes and prevents instantaneous pressure equalization between the two volumes. The metering rate through the flow passage 140 can be adjusted by using multiple inserts and/or by varying the compaction and hence the porosity of the insert 150.

Figure 2:
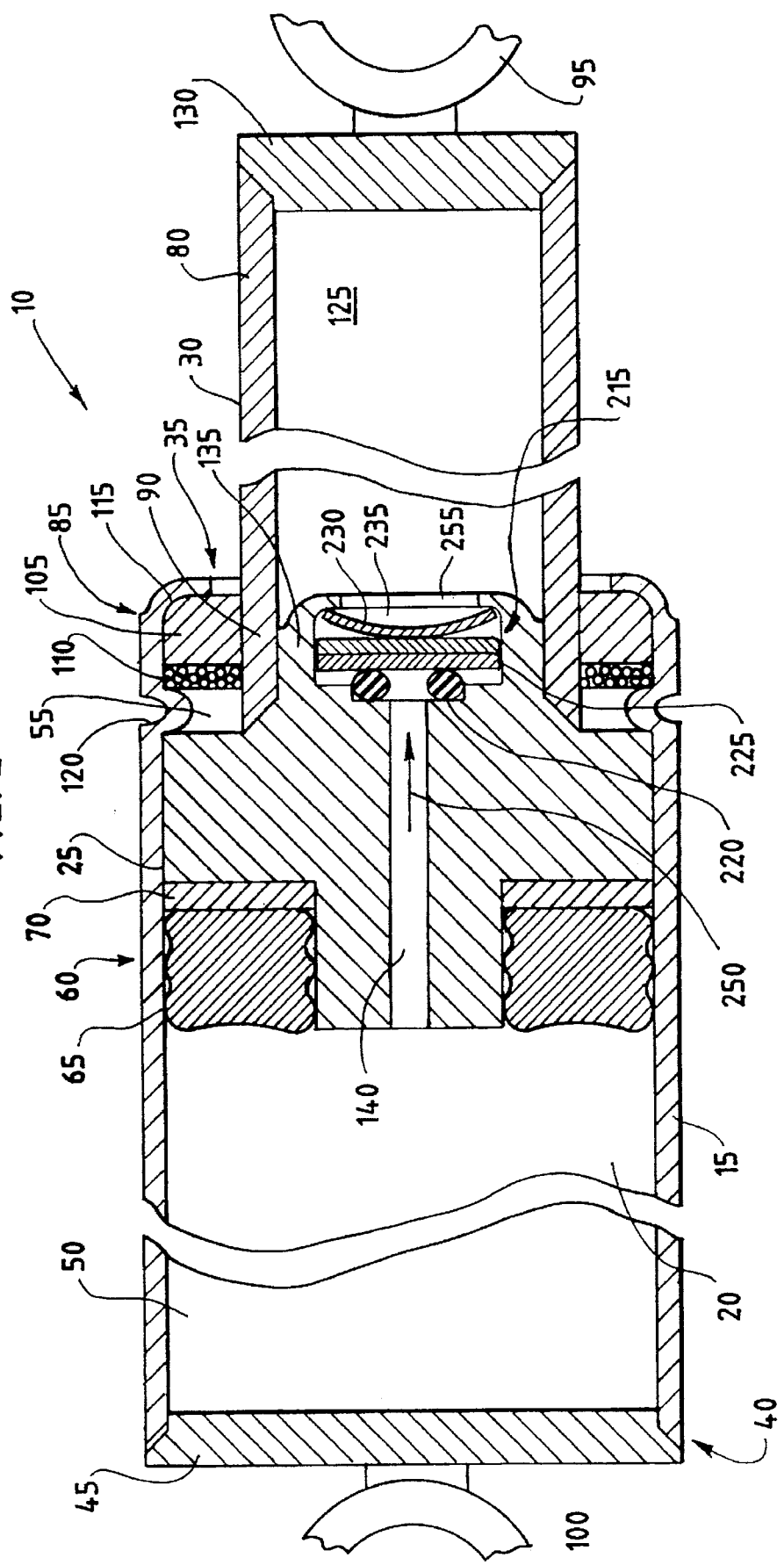
FIG. 2 is a cross-sectional view of a second embodiment of the pneumatic spring.

Referring to FIG. 2 a second embodiment of the pneumatic spring 10 is illustrated. The first and second embodiments utilize many of the same components, so the same reference numbers have be used to identify like components in FIGS. 1 and 2. The primary difference between the two embodiments is that the second embodiment employs a check valve 215 which provides restricted rate flow of gas during the extension stroke, and relatively free, by-pass gas flow through the flow passage during the compression stroke.

The check valve 215 includes an O-ring seal 220, a gas permeable washer stack 225, and a spring 230 such as a Belleville valve spring, all of which are positioned in a counterbore 235 formed in the reduced diameter portion 135 of the piston 25. The end of the counterbore 235 is swaged to secure the valve components within the counterbore 235. The O-ring seal 220 is mounted in a recess formed at the junction of the flow passage 140 and the counterbore 235. The spring 230 normally biases the washer stack 225 against the O-ring seal 220. The washer stack 225 is slidable in the counterbore 235 between a closed position at which the washer stack 225 abuts the O-ring seal 220, and an open position at which the washer stack 225 is disengaged from the O-ring seal.

During the extension stroke, the washer stack 225 is biased to its closed position by the spring 230, and also by the higher gas pressure of the piston rod internal chamber 125. When the washer stack 225 is at its closed position, gas flow through the flow passage 140 is limited by the rate of fluid flow through the washer stack. As such, the pneumatic spring 10 has a response rate during the extension stroke which is similar to that of a spring employing the permeable insert 150 described above. During the compression stroke, however, the washer stack 225 is biased to its open position in response to the pressure in the compression compartment 50 exceeding the pressure in the piston rod internal chamber 125 by an amount sufficient to overcome the force of the spring 230. In particular, the increasing gas pressure in the compression compartment 50 during the compression stroke exerts a force on the washer stack 225 in the direction of the arrow 250. When this force exceeds the force of the spring 230, the washer stack 225 is biased off of the O-ring seal 220, i.e., to its open position. The permeable washer stack 225 has a smaller outer diameter than the diameter of the counterbore 235, to permit the gas to by-pass the washer stack when the stack is biased to its open position. The gas flows through the flow passage 140, between the washer stack 225 and the O-ring 220, into the space between the outer diameter of the washer stack 225 and the walls of the counterbore 230, through the opening 255 in the end of the counterbore 235, and into the piston rod internal chamber 125.

The washer stack 225 is formed of a plurality of gas permeable washers made from a porous material similar to the materials described above in connection with the permeable insert 150. As will be appreciated, the stack 225 can be used with or without the permeable insert 150. If the permeable insert 150 is not employed, the flow rate during the extension stroke is controlled solely by the flow rate through the permeable washer stack 225. The number of washers, as well as the porosity of the washers, can be varied to vary the flow rate in accordance with the requirements of a particular application. It should be appreciated that the washer stack 225 can be used in combination with the permeable insert 150 to decrease the flow rate through the passage 140.

Figure 3:
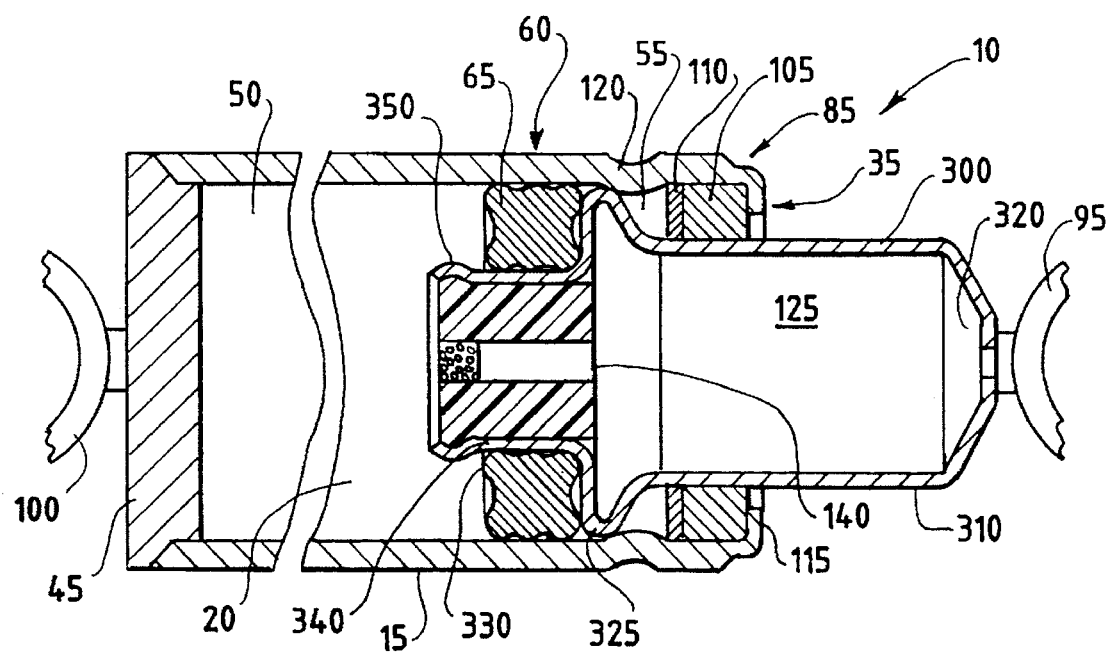
FIG. 3 is a cross-sectional view of a pneumatic spring incorporating an integrally formed piston and piston rod assembly.

FIG. 3 illustrates an integrally formed piston rod and piston assembly 300 which can be employed in the pneumatic counterbalance spring 10. This integrally formed assembly is preferable from a cost and manufacturing standpoint. The integral assembly 300 is formed from tubular stock, such as steel, processed to achieve the shape illustrated in FIG. 3. In particular, the assembly 300 includes a rod portion 310 and a piston portion 315. The rod portion 310 is slidably mounted in the bushing assembly 85 and extends out of the cylinder 15. The rod portion 315 defines the hollow internal chamber 125 and the extending end of the rod portion 310 is swaged to seal the internal chamber 125 from the atmosphere. Alternatively, the end can be sealed using an end cap similar to those described above. Ideally, the swaged end includes a pressurizing hole 320 which is used to pressurize the internal chamber and the extension chamber 50 during the manufacturing process. Once the cylinder is pressurized, the pressurizing hole is sealed by a pin, rivet, or by welding the connector link 95 to the end of the rod portion 310.

The piston portion 315 includes an increased diameter portion 325 and a reduced diameter portion 330. The increased diameter portion 325 forms a close, free sliding fit with the inner diameter of the cylinder 15, whereas the reduced diameter portion 330 is sized to carry the seal assembly 60. A nonporous insert 340 mounted within the reduced diameter portion of the piston defines the flow passage 140 extending between the compression chamber and the piston rod internal chamber 125. The inner end of the tube is swaged to secure the insert 340 within the tube. A gas permeable insert similar to those described above can be positioned in flow passage 140. Alternatively, the nonporous insert can be constructed to include a check valve (not shown) similar to that described above, and shown in FIG. 2.

Figure 4:
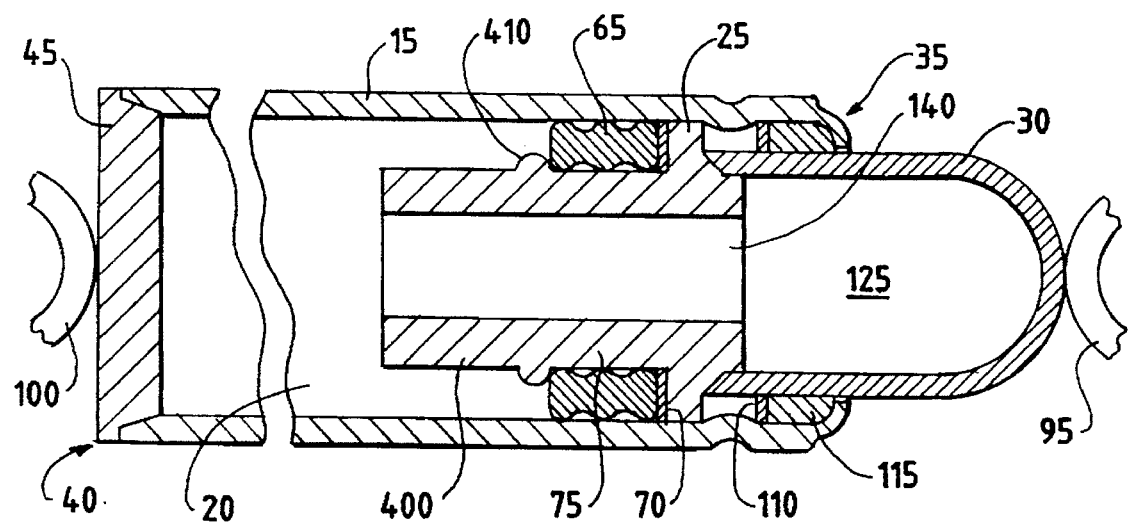
FIG. 4 is a cross-sectional view of an alternative piston design which can be employed in the pneumatic spring of FIG. 1.

FIG. 4 illustrates an alternative design for the piston 25 used in the embodiments illustrated in FIGS. 1 and 2. The embodiment shown in FIG. 4 utilizes many of the same or similar components to those utilized in the embodiments shown in FIGS. 1 and 2. Hence, like components have been indicated with the same reference numerals and only the differences will be discussed at this point. The primary difference is that the piston 25 in FIG. 4 includes an inwardly protruding extension 400 which extends beyond the inner face of the Quad seal 65. The extension prevents the seal lubricant from entering the flow passage 140. This is especially important when a permeable insert (FIG. 1) and/or a permeable washer stack (FIG. 2) are positioned in the bore because the lubricating oil could plug these porous components, thereby adversely affecting the flow rate of the spring 10. It is to be appreciated that in instances where an increased gas flow rate is required, it may be desirable to leave the flow passage 140 open as is shown in FIG. 4.

In the illustrated embodiments, the inner end of the piston 25 serves as a stop for the spring during its compression stroke. In particular, the inner end of the piston engages against the closed end 40 of the cylinder to limit inward movement of the piston 25. Alternatively, rolled indentations (not shown) may be formed in the wall of the compression compartment 50 to limit travel during the compression stroke.

The pneumatic spring 10 described herein is advantageous over traditional gas springs in which both the extension and compression compartments are pressurized. In the present design only the compression compartment is pressurized, and thus, the pressurized gas acts against the entire projected surface area of the piston face. Because the pressurized gas acts on a larger surface area in the present design, equivalent output forces are produced at much lower internal pressures than are required by traditional gas springs. For example, prototype units pressurized at 100 psi at compression produce an output force which is approximately equal to that of a traditional gas spring pressurized at 700 psi. The lower operating pressures of this design allow less costly and lighter materials to be used. The lower operating pressure also extends the life of the spring 10 by reducing the likelihood that the spring 10 will lose its charge due to gas leakage. A significant benefit of the pneumatic spring 10 is that damping is fully independent of spring orientation, unlike most oil damping systems. In addition, an integrally formed piston rod and piston can be employed to further reduce the cost of the unit. The permeable insert and permeable check valve provide a wide variety of flow control options to suit the needs of a wide range of applications.

Although the present invention has been described with reference to specific embodiments, those of skill in the art will recognize that changes may be made thereto without departing from the scope and spirit of the invention as set forth in the appended claims.

What is claimed is:

1. A pneumatic spring, comprising:
   a hollow cylinder having an open end and a closed end, and defining a first internal chamber;
   a piston rod slidable mounted in the open end of the cylinder, the piston rod defining a second internal chamber and having a first end extending into the first internal chamber and a second end projecting from the open end of the cylinder;
   a piston slidable positioned in the cylinder and dividing the first internal chamber into a compression compartment adjacent the closed end of the cylinder and an extension compartment adjacent the open end of the cylinder, the volumes of the compression and extension compartments varying in accordance with the position of the piston, the piston being connected to the first end of the piston rod for movement away from the cylinder closed end during an extension stroke and toward the cylinder closed end during a compression stroke;
   a predetermined quantity of gas in the compression compartment under a pressure in excess of atmospheric pressure;
   a seal assembly mounted on the piston and adapted to prevent gas flow between the compression and extension compartments;
   a flow passage extending through the piston between the compression compartment and the second internal chamber and permitting gas flow therebetween; and
   a gas permeable insert of a predetermined porosity positioned in the flow passage and adapted to provide restricted flow rate of gas through the flow passage.

2. A pneumatic spring as set forth in claim 1, wherein the gas permeable insert is formed of sintered bronze.

3. A pneumatic spring as set forth in claim 1, wherein the gas permeable insert is formed of sintered iron.

4. A pneumatic spring as set forth in claim 1, wherein the gas permeable insert is formed of porous ceramic.

5. A pneumatic spring as set forth in claim 1, wherein the gas permeable insert is formed of combinations of sintered iron and sintered bronze.

6. A pneumatic spring as set forth in claim 1, wherein the gas permeable insert is formed of combinations of plastic.

7. A pneumatic spring as set forth in claim 1, further comprising a valve means for enabling restricted flow rate of gas through the flow passage during the extension stroke and a free by-pass flow of gas through the flow passage during the compression stroke.

8. A pneumatic spring as set forth in claim 7, wherein the valve means comprises:
   a valve seat formed in one end of the fluid passage;
   a seal positioned in the valve seat;
   a gas permeable insert mounted for movement relative to the valve seat between a first position at which the gas permeable insert abuts the seal and restricts gas flow through the flow passage to that which flows through the gas permeable insert and a second position at which the permeable insert is disengaged from the seal to permit gas flowing through the flow passage to by-pass the gas permeable insert; and
   means for biasing the gas permeable insert to its first position unless the internal pressure of the compression compartment exceeds the internal pressure of the second internal chamber by a preselected amount.

9. A pneumatic spring as set forth in claim 8, wherein the gas permeable insert is formed of sintered bronze.

10. A pneumatic spring as set forth in claim 9, wherein the gas permeable insert is formed of sintered iron.

11. A pneumatic spring as set forth in claim 9, wherein the gas permeable insert is formed of porous ceramic.

12. A pneumatic spring as set forth in claim 9, wherein the gas permeable insert is formed of a combination of sintered iron and sintered bronze.

13. A pneumatic spring as set forth in claim 9, wherein the gas permeable insert is formed of plastic.

14. A pneumatic spring as set forth in claim 1, further comprising a bushing assembly fixedly mounted in the open end of the cylinder, the bushing having a center opening for slidably engaging and supporting the piston rod as it moves relative cylinder.

15. A pneumatic spring as set forth in claim 1, wherein the extension chamber is at a pressure which approximates atmospheric pressure.

16. A pneumatic spring as set forth in claim 1, wherein the piston and piston rod are integrally formed.

17. A pneumatic spring as set forth in claim 16, wherein the piston and the piston rod are integrally formed from steel tubing.

18. A pneumatic spring as set forth in claim 17, wherein the piston further comprises a nonporous insert mounted in the steel tubing and defining a fluid passage between the compression compartment and the second internal chamber.

19. A pneumatic spring as set forth in claim 16, further comprising a porous insert mounted in the fluid passage and adapted to provide a restricted flow rate of gas between the compression compartment and the second internal chamber.

20. A pneumatic spring spring as set forth in claim 1, wherein a predetermined quantity of lubricating oil is contained in the compression compartment to provide a lubricating film between the piston seal and the internal surface of the hollow cylinder.

21. A pneumatic spring as set forth in claim 20, wherein the piston is formed with an inwardly protruding extension to prevent the lubricating oil from entering said flow passage.

* * * * *